United States Patent [19]
Aoyama

[11] 3,880,623
[45] Apr. 29, 1975

[54] DUST AND MIST COLLECTOR

[75] Inventor: Mitsugu Aoyama, Gifu-ken, Japan

[73] Assignees: Nihon Jescoal Industry Co., Ltd., Tokyo; Mitsugu Aoynama, Gifu-ken, both of Japan

[22] Filed: July 6, 1973

[21] Appl. No.: 377,098

[30] Foreign Application Priority Data
July 11, 1972   Japan.............................. 47-69775

[52] U.S. Cl. ...................... 55/230; 55/263; 55/406; 261/92
[51] Int. Cl. ........................................... B01d 47/08
[58] Field of Search ............ 55/230, 228, 247, 263, 55/406; 261/92

[56] References Cited
UNITED STATES PATENTS
807,695   12/1905   Theisen................................. 261/92
1,022,857   4/1912   Markus................................. 261/92

FOREIGN PATENTS OR APPLICATIONS
312,271   3/1930   United Kingdom.................. 55/407
922,488   4/1963   United Kingdom.................. 261/92

*Primary Examiner*—Bernard Nozick
*Attorney, Agent, or Firm*—Frank J. Jordan

[57] ABSTRACT

A contaminated air introduced within a casing together with a water vapour or a cooled water as a contacting medium is vibrated and stirred by rotation of a polygonal rotor to provide thereby a contaminated article ranging from grain grade to molecule grade is collected or dissolved and removed.

5 Claims, 5 Drawing Figures

DUST AND MIST COLLECTOR

BACKGROUND OF THE INVENTION

This invention relates to a dust and mist collector, more specifically to an apparatus as air cleaner which separates and collects airborne contaminated article including smoke from combustion apparatus, gas compound, molecule compound (particularly odor), other metallic vapour, or organic and inorganic dust.

PRIOR ART

There are many sorts of known dust and mist collectors corresponding with usage, and material to be collected and collection property are different at various sorts of the apparatuses.

For example, a cyclone can collect dust and mist of about $0.1 \sim 1500\mu$, and an electric dust and mist collector can collect contaminated material at grain grade of $0.01 \sim 50\mu$. However contaminated material at molecule grade of less than $0.01\mu$ size such as sulphur oxides, nitrogen oxides and other harmful component contained in organic and inorganic harmful gas or exhausted gas can not be eliminated by these apparatuses.

OBJECT OF THE INVENTION

An object of the present invention is to provide a dust and mist collector which can eliminate a contaminated material ranging from molecule grade of about $0.001\mu$ to grain grade of about $1300\mu$.

Another object of the present invention is to provide an apparatus in which a saturated water vapour is used as a collecting medium and a contaminated material is separated and eliminated by growth of water vapour molecule including contaminated material as a nucleus.

Further object of the present invention is to provide a dust and mist collector which eliminates a contaminated material of grain grade using a cooled water as a collecting medium.

A feature of the present invention is in that contaminated material at grain grade such as dust and soot as well as contaminated material at molecule grade such as sulphur oxides, nitrogen oxides and carbon monoxide contained in odor and harmful gas can be eliminated.

Another feature of the present invention is in that said contaminated material at grain grade and molecule grade may be eliminated in very high efficiency.

Further feature of the present invention is in that a saturated water vapour at high temperature or a cooled water is used as a collecting medium, said collecting medium and a contaminated air being applied stirring and vibration of large amplitude, thereby a contaminated material is dissolved or collected and then separated by centrifugal force.

Still another feature of the present invention is in that apparatus construction is quite simple and can be utilized at lower cost than in other known apparatuses.

Still further objects and features of the present invention will be apparent from the following description taken in connection with the accompanying drawings wherein.

Detailed Description of the Invention

Figure 1:
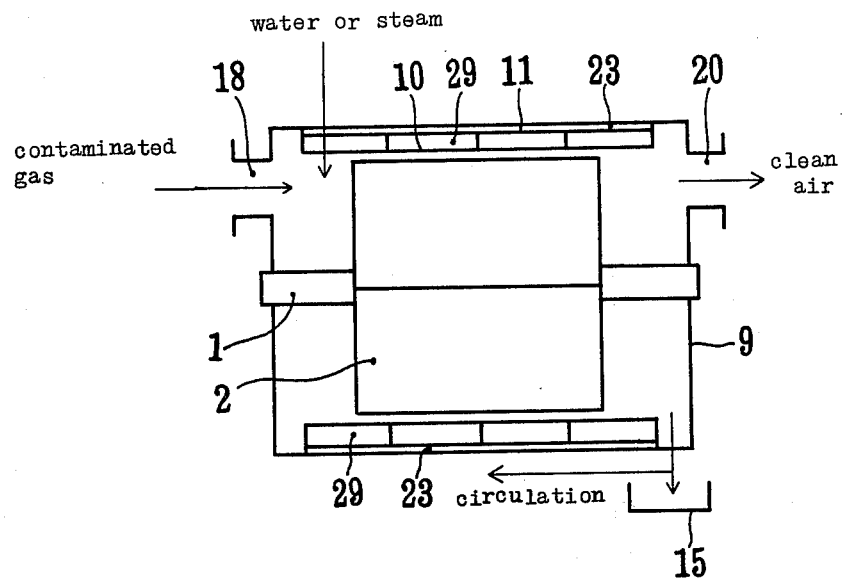
FIG. 1 is a schematic illustration showing principle of apparatus of the present invention.
Figure 5:
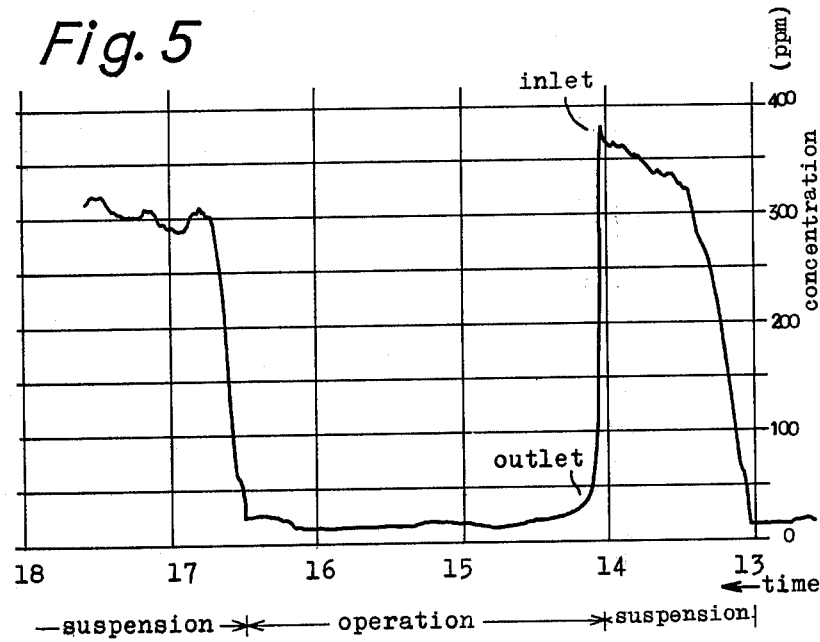
FIGS. 4, 5 are diagram showing air contamination state according to $SO_2$ at using and not using of apparatus of the present invention.
Figure 2:
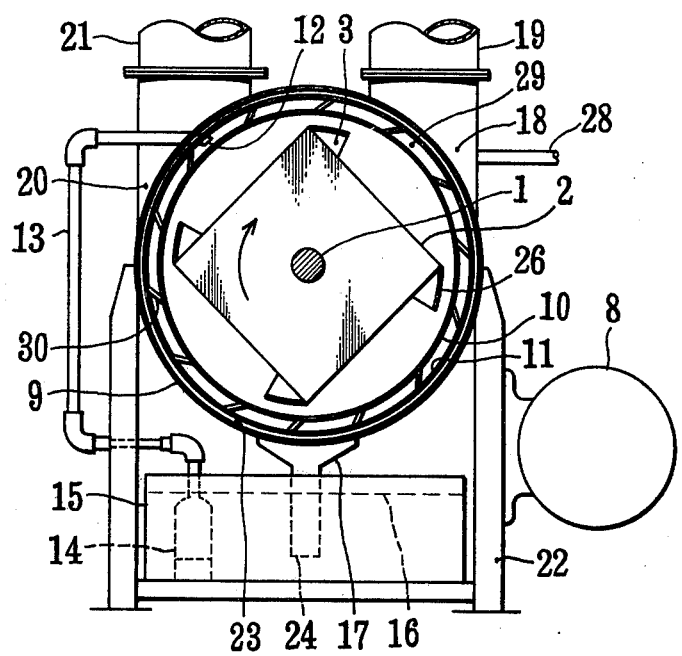
FIG. 2 is an elevational view partly in section of apparatus of the present invention.
Figure 3:
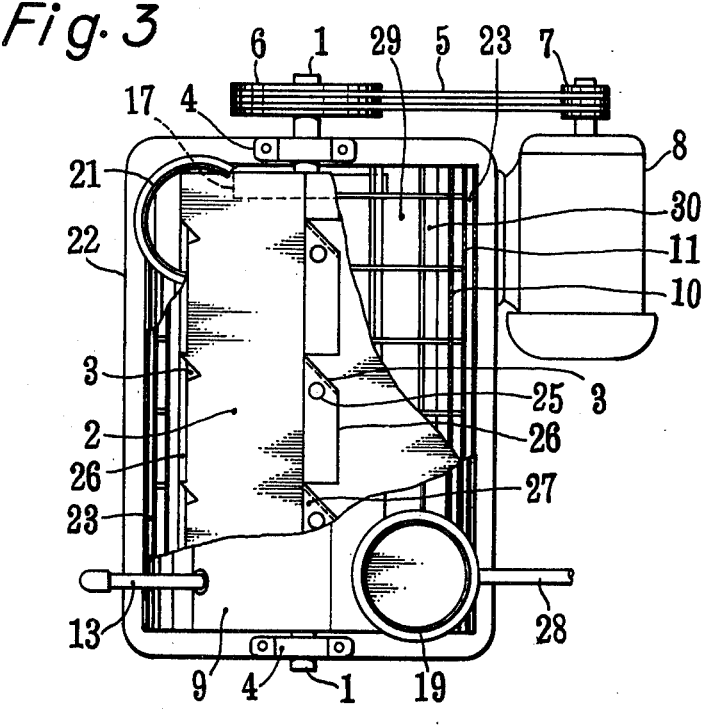
FIG. 3 is a plan view partly in section of apparatus of the present invention.
Figure 4:
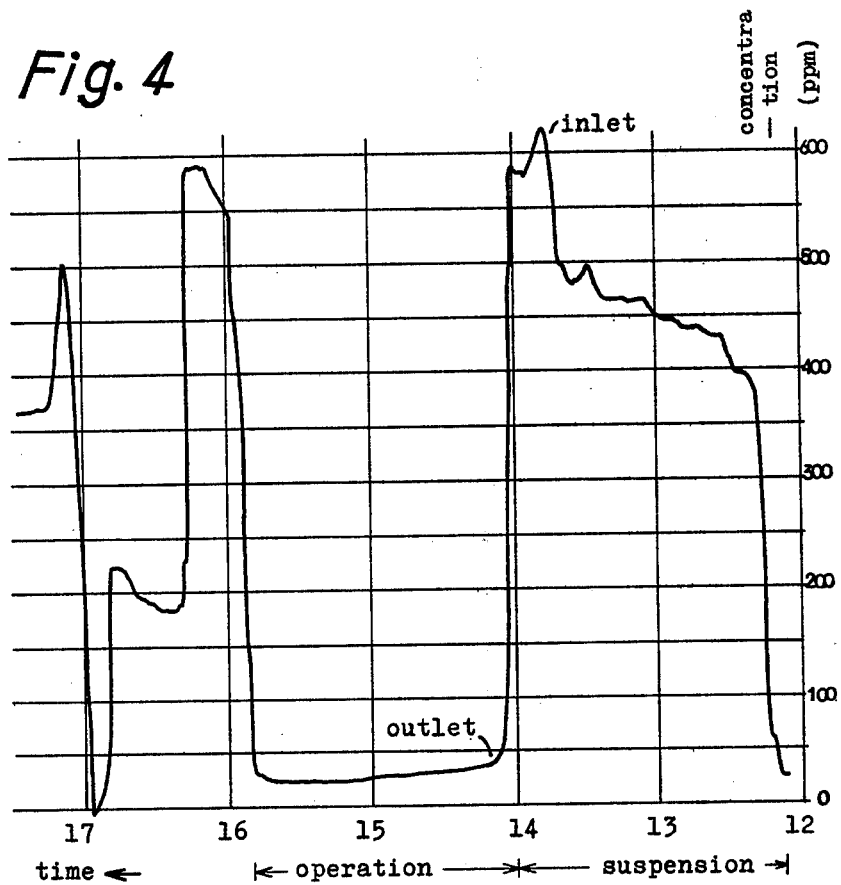

On a support is laterally installed a hollow cylindrical casing 9 both side walls of which are closed. Along inner whole circumference of the casing 9 are concentrically arranged two latticed cylinders 10 and 11 spaced with a clearance 23. Two cylinders 10 and 11 are connected with suitable radial distance by resistance plates 30 inclined to a direction of a rotating whirlwind of a rotor 2 explained later, so that substantially many latticed chambers 29 are formed between two cylinders 10 and 11.

On one side of the casing 9 is provided a contaminated air inlet 18 connected with an introducing pipe 19, while in another side is provided a clean air outlet 20 connected with an exhaust pipe 21. The contaminated air inlet 18 is provided with a steam pipe 28 which is connected to a boiler (not shown) and is used for supplying a hot water vapour to the casing 9. Below the casing 9 is placed a vessel 15 for storing a carried away water together with a contaminated material which was collected in the casing. Water in the vessel 15 is filtered and transmitted through a water pump 14 and a pipe 13. Then cooling water is sprayed through a nozzle 12 projecting in the casing near the contaminated air inlet 18. At the bottom of the casing provided a drain 17 thereby water which collected a contaminated material is carried away through a drain pipe 24 to said vessel 15.

Within the casing 9 is provided a polygonal tube shaped rotor 2 constituted of plate material. At both side of the rotor 2 is projected a shaft 1, 1 which penetrates both side walls of the casing 9 and is supported at bearings 4, 4 mounted on the support 22. On one side of the shaft is installed a pulley 6 which is connected with another pulley 7 by a belt 5.

The rotor 2 has polygonal shape usually with several vertexes (4 vertexes in the embodiment) and the inner latticed cylinder 11 provided within the circular sectional casing and vertex protion of the rotor 2 approach closely but do not contact with each other, so that suitable number of arcuate chambers are formed between the rotor surface and the cylinder surface.

Each vertex portion of the rotor 2 is provided with a pressure receiving plate 26 projecting in rotation direction along edge line which pressure receiving plate is useful when a cooled water is used as a collecting medium. Every receiving plate 26 is separated at several points in longthwise direction thereby formed as a suitable number of pressure receiving surfaces per edge line. Every pressure receiving surface constitutes a wing 3 bended slantly inwards towards the surface of the rotor 2, and on the surface of the pressure receiving plate 26 at a rear portion 27 of the wing 3 is provided with a hole 25 for liberating water.

Performance of the present invention will be explained.

The rotor 2 of polygonal shape is rotated in arrow direction by a motor 8. Thereby centrifugal wind pressure is generated by rotation within the casing 9. The generated wind pressure is instantaneously pushed and compressed in each latticed chamber 29 constituted by two latticed cylinders 10, 11 and the resistance plates 30 connecting the cylinders. According to fluid pressure difference between front part and rear part against the edge line of the rotor, fluid is compressed by passing of the rotor edge line and then pressure is released instantaneously. Thus strong vibration of fluid is generated according to repeated action of compression and release in the casing 9. Since the vibration of fluid does not affect suction and exhaust at the introducing pipe 19 and exhaust pipe 21, introducing a contaminated water may be performed by connecting a blower or fan at front step or rear step of the apparatus.

Exhaust air including a contaminated material introduced through exhaust duct of plant and at the contaminated air inlet 18 into the casing 9 is humidified by hot water vapour being sent via steam pipe 28. The hot water vapour at saturation state fills the casing and according to rotation of the rotor 2 the saturated water vapour and the contaminated air may be stirred and mixed. At this state, when a cooled water is sprayed through the nozzle 12 into the casing, temperature of hot water vapour molecule enveloping the contaminated material decreases and becomes the dew point of saturated water vapour. At the moment the vapour is condensed and becomes visible vapour including particle formed with contaminated material as a nucleus.

Thus the contaminated material may be collected by the visible vapour as a collecting medium. Therefore a saturated water vapour molecule at unvisible state must already mix with a contaminated material molecule.

The contaminated material completely collected by the visible vapour may be treated by collecting the vapour, however the vapour generated at visible state is very unstable particle and readily decomposed at influence of pressure and temperature therefore fast treatment is required.

The visible vapour thus generated has so small mass that the vapour cannot be collected by centrifugal separation of the rotor 2. In order to collect the vapour of small mass, the vapour particle mass must be increased by contact polymerization and aggregation. This is similar to a process in that small particle of cloud grows large and rain drops to ground.

The water vapour particle of small mass accompanied by a contaminated material may be subjected to rotating air flow with stirring of higher pressure and lower pressure generated at front part and rear part of edge line of the rotor 2 in the latticed chambers 29 between the cylinders 10 and 11 arranged at inner wall of the casing 9. In this state, large variation of air pressure and fluid vibration with short period are repeatedly generated so that the visible vapour articles change from unstable state to one liquid particle and further liquid particles grow to a liquid drop by contact aggregation. The liquid drops including a contaminated material are spreaded through the latticed chamber 29 by centrifugal force of the rotor and are contacted to the casing wall, then flow through clearance 23 and fall down through the drain 17 and drain pipe 24 to the vessel 15.

As illustrated in the above embodiment contaminated material ranging to molecule grade can be eliminated using hot water vapour as collecting medium. When enough water vapour cannot be obtained, contaminated material at grain grade may be eliminated using only a cooled water as a collecting medium. In this case, the pressure receiving plate 26 provided at edge portion of the rotor 2 is useful.

Collecting performance in this case will be explained. A cooled water is poured in the casing 9 to a half or more of its volume and also a contaminated air is introduced in the casing then the rotor 2 is driven. Then collected liquid is stirred and vibrated to be mixed with the contaminated air. Air including contaminated material becomes a bubble by being pressed with mutual action of water layer dipped up at the rear portion 27 of the pressure receiving plate 26 arranged at edge portion of the rotor 2 during rotation and water layer sprayed through the nozzle 12, and at last air is dissolved into water thereby contaminated material at grain grade is transferred to water. This dissolving action by vibration and pushing of water is effected also in the latticed chambers 29. In this case, by arrangement of the hole 25 at one side of the pressure receiving plate 26 and the slantly mounted wing 3 at other side, water stored at the rear portion 27 is always sent towards the hole 25.

As above mentioned, by mixing water vapour or water as a collecting medium with plant exhaust air and stirring and vibration action, contaminated material is dissolved or collected so that air exhausted through the exhaust pipe is cleaned at about 90~100 percent.

Contaminated material eliminating condition in comparison at use and no use of the present invention apparatus is illustrated in FIG. 4 and FIG. 5.

FIG. 4 illustrates examples using C heavy oil including sulphur 1.4 percent. Sulphur oxides concentration at inlet of the present invention apparatus is 620 ppm. On account of operation of the present invention apparatus using a high temperature saturated water vapour and a cooling water, the concentration value remarkably decreases to 20~30 ppm as shown in bottom portion of the graph.

FIG. 5 similarly illustrates result of exhaust gas at burning of C heavy oil including kerosene 20 percent in comparison at use and no use of the present invention apparatus using a high temperature saturated water vapour and a cooling water. Concentration value is 360~400 ppm at no use of the apparatus while the value decreases to about 20 ppm at use of the apparatus. This result clearly illustrates remarkable cleaning proparty of the present application apparatus.

Moreover as illustrated in Table 1, not only a contaminated material at grain grade but also a contaminated material at molecule grade such as odor, which cannot be eliminated by conventional known apparatus, can be eliminated and thereby applied range is remarkably enlarged.

In addition, construction of the apparatus is simple and compact, therefore installation area becomes small and maintenance cost and performance cost are inexpensive.

The apparatus according to the present invention has remarkable effect for prevention of air contamination which is an important problem in recent years.

Further a plurality of apparatuses in series arrangement can produce better effect wherein exhaust gas may be cleaned at each step in turn.

Table 1

Comparison of collecting property in various sorts of dust and mist collectors

| air contaminating material | range for collection ($\mu$) $10^4$ — $10^3$ — $10^2$ — $10$ — $1$ — $10^{-1}$ — $10^{-2}$ — $10^{-3}$ |
|---|---|
| rain, fog | $10^4$ – $10^2$ |
| cement | $10^3$ – $10$ |
| dust coal | $10^3$ – $10$ |
| metallurgic dust | $10^2$ – $10$ |
| fly ash | $10^2$ – $10$ |
| sulfuric acid mist | $10^2$ – $1$ |
| $SO_3$ mist | $10^2$ – $1$ |
| smoke by oil | $10$ – $10^{-1}$ |
| Zinc chloride | $10$ – $10^{-1}$ |
| Magnesium oxide | $10$ – $10^{-1}$ |
| Smoking (white, blue) | $1$ – $10^{-1}$ |
| Carbon black | $1$ – $10^{-2}$ |
| Odor, organic & inorganic | $10$ – $10^{-2}$ |
| Dust and mist collector | |
| Present invention | $10^3$ – $10^{-2}$ |
| Inertia method | $10^2$ – $10$ |
| (unlabeled) | $10^2$ – $10$ |
| bag filter | $10$ – $1$ |
| filling method | $10$ – $1$ |
| scrubber | $10$ – $1$ |
| cyclone | $10^2$ – $1$ |
| Electric collector | $10$ – $10^{-2}$ |
| Ultrasonic wave | $10$ – $10^{-2}$ |

Example of embodiment according to the present invention will be explained. Example 1 and Example 2 are relating to water vapour or water as a collecting medium, and Example 3 uses only water as a collecting medium.

EXAMPLE 1.

| Equipment | Burning furnace of waste |
|---|---|
| Fuel | heavy oil |
| Exhaust gas amount | 20000Nm³/h |

Operation condition of the present invention apparatus

| collecting medium | vapour water | use circulation 5~8 l/min |
|---|---|---|
| Added chemicals | 0.4% NaOH solution circulation | |
| Flow velocity at measuring point | 4.6 m/sec | |

Measuring analysis result

EXAMPLE 1.-Continued

| Equipment | Burning furnace of waste |
|---|---|
| Fuel | heavy oil |
| Exhaust gas amount | 20000Nm³/h |

Operation condition of the present invention apparatus

| collecting medium | vapour water | use circulation 5~8 l/min |
|---|---|---|

| Measured item | Inlet | Outlet | Elimination ratio |
|---|---|---|---|
| Moisture % | 7.2 | 7.0 | — |
| Soot (g/Nm³) | 1.527 | 0.033 | 97.8 |
| Hydrogen chloride (ppm) | 23 | 2.9 | 87.4 |

EXAMPLE 2

| Equipment | Fire brick burning furnace |
| --- | --- |
| | Coal tar gas generator |
| Fuel | heavy oil |
| Exhaust gas amount | 15000 Nm³/h |

Operation condition of the present invention apparatus
(2 apparatuses, series operation)

| Collecting medium | vapour water | use circulation water 5~8 l/min |
| --- | --- | --- |
| Added chemicals | | 0.4% NaOH solution circulation |
| Flow velocity at measuring point | | (1) 5m/sec   (2) 3.5m/sec |

Measuring analysis result

| Measured item | Inlet | Outlet | Elimination ratio |
| --- | --- | --- | --- |
| Moisture % | (1) 6.2 | (1) 5.6 | — |
| | (2) 1.9 | (2) 4.1 | — |
| Soot (g/Nm³) | 1.78 | 0.09 | 94.9 |
| Sulphur oxides (ppm) | 329.1 | 8.4 | 97.4 |
| Nitrogen oxides | 392 | 123 | 68.6 |
| Coal tar (mg/Nm³) | (1) 709.1 | 8.9 | 98.7 |
| | (2) 5.5 | trace | 100 |

EXAMPLE 3

| Equipment | Tile burning furnace |
| --- | --- |
| Fuel | heavy oil |
| Exhaust gas amount | 10000Nm³/h |

Operation of the present invention apparatus

| Collecting medium | Vapour water | no use circulation water 5~8 l/min |
| --- | --- | --- |
| Added chemicals | (1) | Alkali added |
| | (2) | ,, |
| | (A) | |
| Flow velocity at measuring point | (A) | 3m/sec |
| | (B) | 7m/sec |

Measuring analysis result

| Measured item | Inlet | Outlet | Elimination ratio |
| --- | --- | --- | --- |
| Sulphur oxides (ppm) | 152 | (1)(A) 7 | 95.4 |
| | | (2)(B) 0 | 100 |
| | | (2)(B) 14 | 90.8 |
| Fluorine oxide (ppm) | 25.8 | (1)(A) 0.7 | 97.3 |
| | | (2)(A) 0.6 | 97.7 |
| | | (2)(B) 0.7 | 97.3 |

What is claimed is:

1. A dust and mist collector comprising a cylindrical casing, gas inlet means admitting inlet gas to one longitudinal end of said casing, gas outlet means for outlet gas at the other longitudinal end of said casing, a fluid inlet means and a drain outlet means in said casing, latticed chambers arranged in fixed positions at the inner cylindrical wall of said casing, said latticed chambers being defined by two concentrically disposed latticed cylinders, a shaft concentrically and rotatably mounted in said cylindrical casing, a polygonal rotor carried by said shaft and rotatable within said casing, resistance plates connecting said latticed cylinders and slanted in a direction corresponding to the rotational direction of said rotor, said polygonal rotor having outer vertexes disposed adjacent to said latticed chambers without contacting the latter, said rotor being provided with pressure receiving plates extending along said vertexes, said polygonal rotor and the inner radial portions of said latticed chambers defining a plurality of chordal spaces each having a variable radial dimension, said fluid inlet means introducing a fluid into said casing which is mixed with the incoming gas introduced through said gas inlet means to form a mixed aggregation which passes through said chordal spaces between said polygonal rotor and said latticed chambers, whereby in passing through the latter the mixed aggregation is repeatedly forced in and out of the latticed chambers as the rotor rotates to thereby impart thereto a repetitive compression and decompression effect to let particles in the mixed aggregation polymerize into liquid which is removed from said casing through said drain outlet.

2. A dust and mist collector according to claim 1 wherein said receiving plates are slanted in a direction corresponding to the rotational direction of the rotor.

3. A dust and mist collector according to claim 1 wherein said fluid inlet means comprises means for introducing water into the gas inlet side of said casing.

4. A dust and mist collector according to claim 1 wherein said drain outlet means comprises a drain outlet at the gas outlet side of said casing for draining water and contaminated material from said casing.

5. A dust and mist collector according to claim 1 including means for introducing steam into the gas inlet side of said casing.

* * * * *